United States Patent Office 3,822,167
Patented July 2, 1974

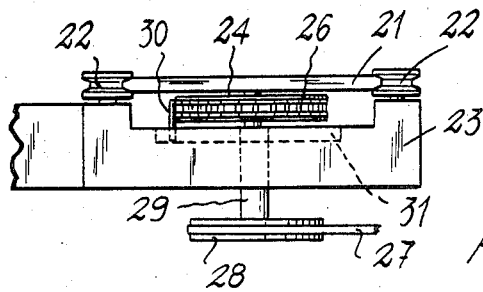
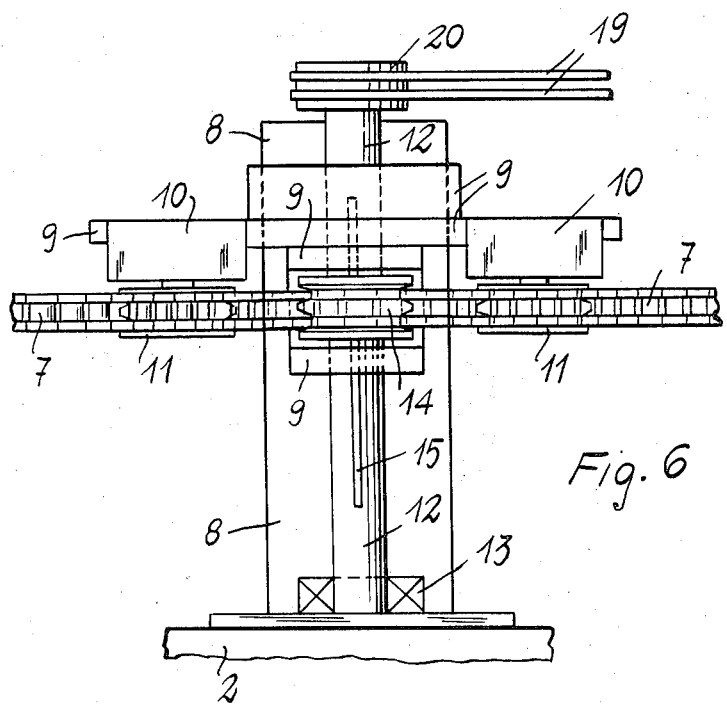
Fig. 5
Fig. 6

3,822,167
APPARATUS FOR PROVIDING RESISTANT HOLLOW CYLINDRICAL BODY MEMBERS
Aldo Piola, Villa Marise, Inverigo, Italy 22044
Filed Mar. 3, 1972, Ser. No. 231,591
Claims priority, application Italy, Mar. 10, 1971, 21,550/71
Int. Cl. B65h 81/00
U.S. Cl. 156—443        6 Claims

ABSTRACT OF THE DISCLOSURE

An apparatus by which resistant hollow cylindrical body members are provided by a trolley which rotates about a vertical cylindrical mold and distributes thread coils or glass webs impregnated with resin containing polymerizing catalysts on said mold. The distribution of threads in the form of coils is effected by a slide carried on the trolley and continuously upwards and downwards reciprocating.

---

This invention relates to an apparatus for providing resistant hollow cylindrical body members, particularly large-sized hollow cylindrical body members.

As well known, when having to provide a large-sized cylindrical body member, such as a silo, it is extremely difficult to transfer said cylindrical body member from the factory to the site where it should be installed.

In order to overcome such a drawback, it has been proposed to wrap up a rigid cylindrical mold with layers of glass fibers impregnated with resin containing a polymerizing catalyst. The layers of glass fibers were distributed as annular layers in a side by side relationship, whilst the resin was sprayed by sprayer guns operated by workers. However, this method was not successful due to the disadvantages it exhibited and mainly consisting in that the resulting hollow cylindrical body members could scarcely withstand the internal pressures, should be defined by highly thick walls, and the resin spraying system by guns directly operated by workers caused substantial injuries to the workers' respiratory apparatus.

The main object of the present invention is to provide a method and apparatus for making hollow cylindrical body members, even of a very substantial size, in a rapid unexpensive manner and without any risk for the workers.

Another object of the invention is to provide a method and apparatus enabling to obtain hollow cylindrical body members exhibiting high mechanical strength even with walls of a comparatively reduced thickness, such body members also having a high resistance to chemical attack.

These and still other objects are accomplished by a method according to which a layer of antiadhesive material is applied to the outer surface of a rigid cylindrical mold, the latter being then covered with a resistant material distributed as continuous coils or spirals, the coil forming resistant material being impregnated with a liquid resin containing polymerizing catalysts, said resistant material being wound on the rigid mold according to a plurality of overlying layers, wherein the coils of one layer are crosswise arranged relative to those of the underlying layer.

The apparatus according to the invention comprises a trolley carried by bearing wheels and from which at least two rollers laterally project for abutting the surface of a rigid cylindrical mold, at least one geared motor unit driving a drive wheel rotatable on a vertical shaft carried by the trolley, and at least one looped chain located on the outer surface of the rigid mold and stretched on said drive wheel, a column erecting from the trolley and forming a guide on which a slide is reciprocated by a chain which is wrapped on two sprockets carried on said column, of which one is driven by said geared motor unit, reel holders of resistant material, members fast with said slide for guiding on said rigid mold the resistant material being unwound from said reels, and devices for impregnating the resistant material being unwound from the reels with a liquid resin containing polymerizing catalysts.

In order that the structure and features of the method and apparatus according to the present invention should be more clearly understood, an embodiment thereof will now be described as given by mere way of not limiting example, reference being had to the accompanying drawings in which:

FIGS. 5 and 6 are enlarged views showing two details of the apparatus.

Figure 1:
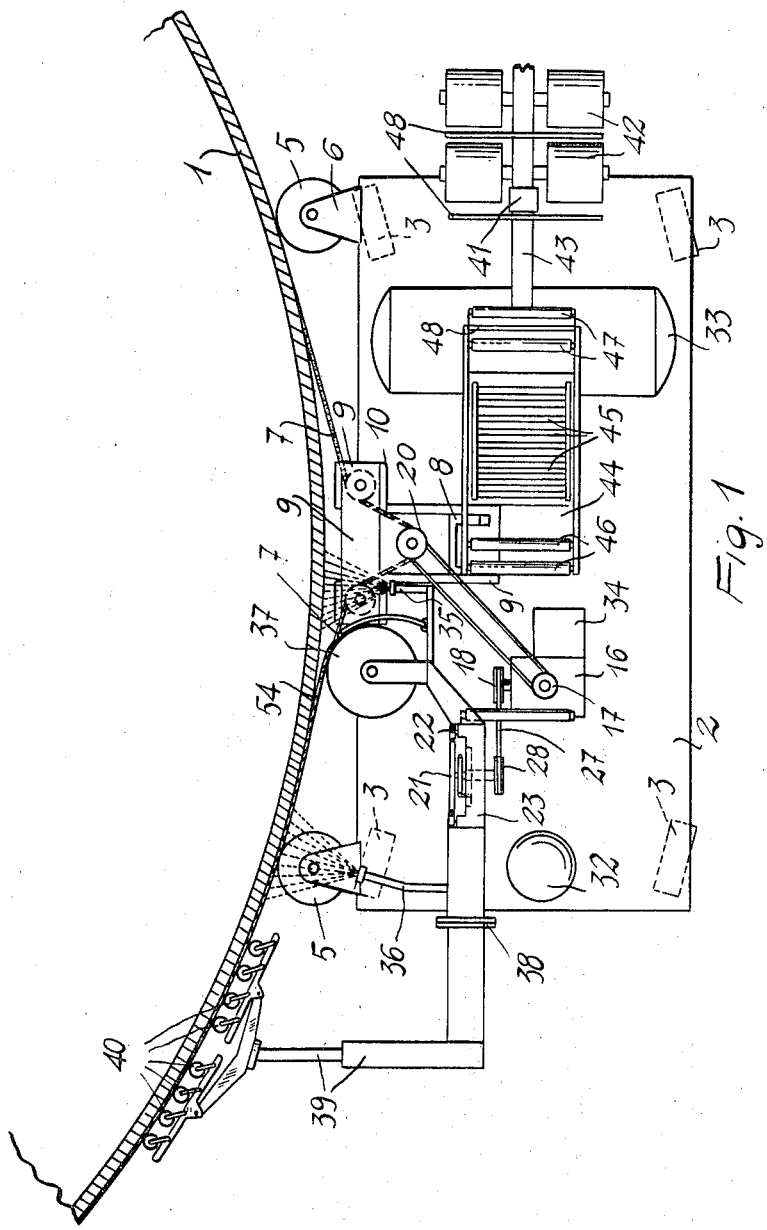
FIGS. 1 and 2 are diagrammatic plan and side elevational views, respectively, showing the apparatus during a processing step for making a hollow cylindrical body member.

The apparatus, as shown in the drawings, is suitable for making hollow body members having substantial dimensions, such hollow body members being automatically made by said apparatus about metal rigid molds 1, preferably provided interconnecting curved wall portions by bolts.

The apparatus comprises a trolley 2 resting on ground by four bearing wheels 3 which are connected to the trolley by means of brackets 4 freely rotatable about a vertical axis not passing through the axis of rotation for said wheels 3, so that the latter will be automatically orientated in the direction of the trolley movement, just as occurs in the case of tea-trolleys and the like.

Figure 3:
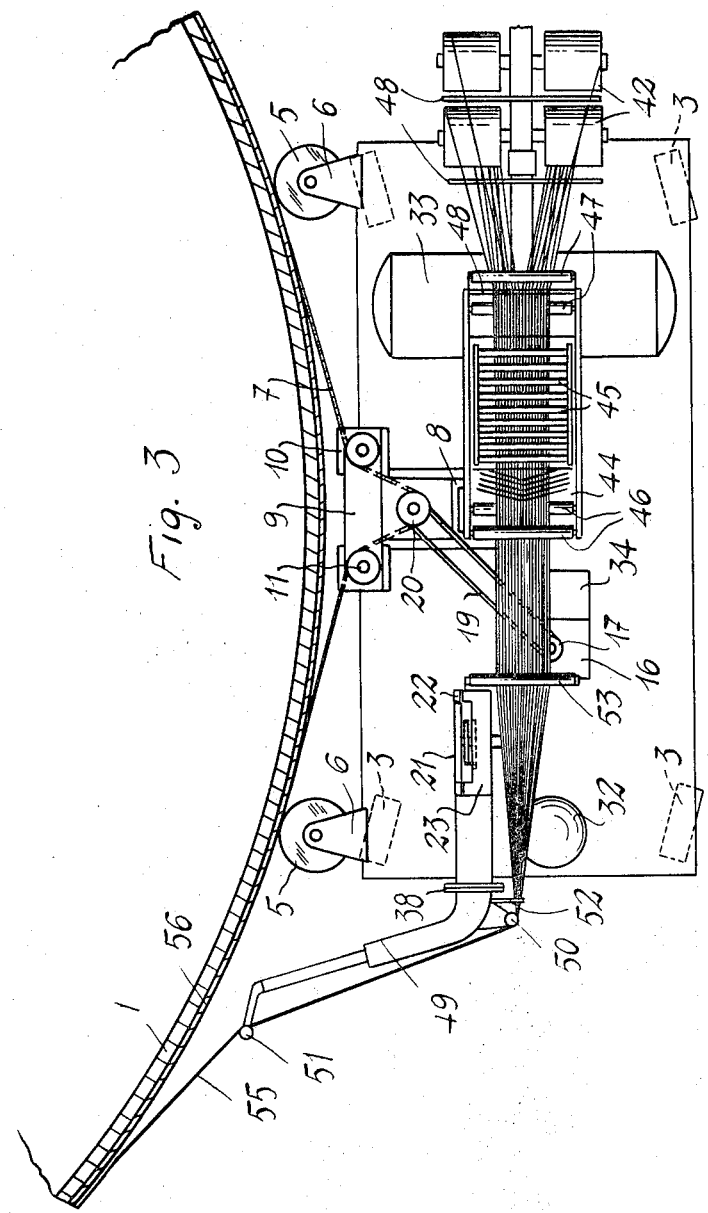
FIGS. 3 and 4 are diagrammatic plan and side elevational views, respectively, also showing the apparatus at a different processing step.

As shown in FIGS. 1 and 3, two rollers 5 project from that side of trolley 2 facing the rigid mold 1, these rollers being freely rotatably carried on one of the bearing elements 6 which are restrained to the trolley platform by such slides and guides as to allow for vertical and horizontal movements of said rollers 5, so that the latter can be moved to or away from the surface of mold 1: the guide and slide system enabling the above mentioned vertical and horizontal movements of the bearing elements 6 for rollers 5 have not been shown for the sake of simplicity in the drawings, since being readily provided by those skilled in the art and unnecessary for understanding the apparatus operation.

During apparatus use, said rollers 5 abut the surface of the rigid mold 1, rolling thereon as trolley 2 moves and being such as to establish the position for said trolley depending on whether said rollers are held more or less projecting from the trolley edge.

At the bottom portion of said rigid mold 1, a stationary crown or ring gear is mounted (not shown in the drawings for the shake of simpilicity) on which a looped chain 7 is wound and engaged. The shape of the teeth on the crown or ring gear fast with the rigid mold 1 is such as to allow for a ready disengagement for the links of chain 7 when the latter is moved away from said crown or ring, as it will become more apparent in the following. Of course, chain 7 could be replaced by a stationary rack or by a looped elongated flexible element, such as a belt, in which case said crown or ring gear is no more necessary, it being however essential that no slipping should occur between said chain, rack or flexible element relative to mold 1.

A metal bearing upwards projects from the trolley, on which metal bearing 8 a rigid element 9 is carried and vertically movable and connected thereto by members (not shown for the sake of simplicity), the portion of which facing mold 1 forming a straight guide on which two sliders 10 are mounted and movable to each other and respectively away from each other, these sliders carrying two tension rollers 11 freely rotatable about their vertical axis.

A vertical shaft 12 is mounted on said trolley 2 sidewise of bearing or support 8, as carried by a bearing 13 and freely rotatable about its own axis. A gear wheel 14 is mounted on said shaft 12 and engages a straight rib 15 outstanding from shaft 12: in other terms, said gear wheel 14 can freely vertically slide along the axis of shaft 12, but cannot rotate relative thereto, being thereby prevented by said rib 15 on shaft 12 extending in a corresponding groove on said gear wheel 14.

Rigid element 9 is so shaped as to extend above and below, respectively, said gear wheel 14 which is coplanar with the tension rollers 11 (FIG. 6): when rigid element 9 is upward or downward moved on support 8, also said tension rollers 11 and gear wheel 14 are upward or downward moved.

FIG. 6 schematically shows the assembly comprising support 8, element 9 along with sliders 10 and tension rollers 11, shaft 12 and gear wheel 14, the assembly being seen from that side of the trolley facing the mold 1.

From the drawings it is clearly shown that chain 7 is wound on gear wheel 14 and held at a stretched condition by rollers 11: accordingly, when shaft 12 is rotated as described hereinafter, this rotation is transmitted to gear wheel 14 which, by acting on chain 7, causes trolley 2 to be fed about the rigid mold 1, as readily apparent from FIGS. 1, 3 and 6.

A geared motor unit 16 is mounted on trolley 2 and has a speed variator which through a gearbox or transmission drives a toothed pulley 17 and through a further gearbox or transmission also drives a toothed pulley 18. Through a toothed belt 19, said pulley 17 drives in turn a toothed pulley 20 keyed on the free end of shaft 12, the latter being thereby rotated by means of geared motor unit 16.

A rigid column 21 is upward directed from trolley 2, the sides thereof defining a guide on which four rollers 22 are slidable as carried by a slide 23, thus being upward and downward movable on column 21.

Adjacent the upper and lower ends of column 21 two sprockets 24 and 25 are respectively mounted and freely rotatable about their axis. From the drawings it will be seen that a chain 26 is wound between said sprockets 24 and 25 and sprocket 25 is driven by pulley 18 through a toothed belt 27 winding on a toothed pulley 28 which is keyed on a shaft 29, said sprocket 25 being also keyed thereon. In FIG. 5 the structure comprising said column 21 and slide 23 along with the associated drive and guide means is shown in an enlarged plan view.

A protruding peg 30 is integral with chain 26 and inserts within an elongated horizontal groove 31 formed on slide 23, this peg 30 supporting the counter-weighed slide 23 and drawing it upwards or downwards as said peg ascends or descends.

A reservoir 32 is mounted on the trolley and contains resins with polymerizing catalysts, such as epoxy resins, bisphenol or isophthalic polyester resins, and a large reservoir 33 is also mounted thereon, pressurized air being supplied thereto from a compressor 34 operated by said geared motor unit 16. In the embodiment as shown in FIGS. 1 and 2, two sprayer guns 35 and 36 are fast with slide 23, the catalyst containing liquid resin from reservoir 32 being sprayed therefrom under the influence of compressed air from reservoir 33, the pipes interconnecting said reservoirs 32 and 33 and guns 35 and 36 not having been shown in the drawings for the sake of simplicity.

Figure 2:
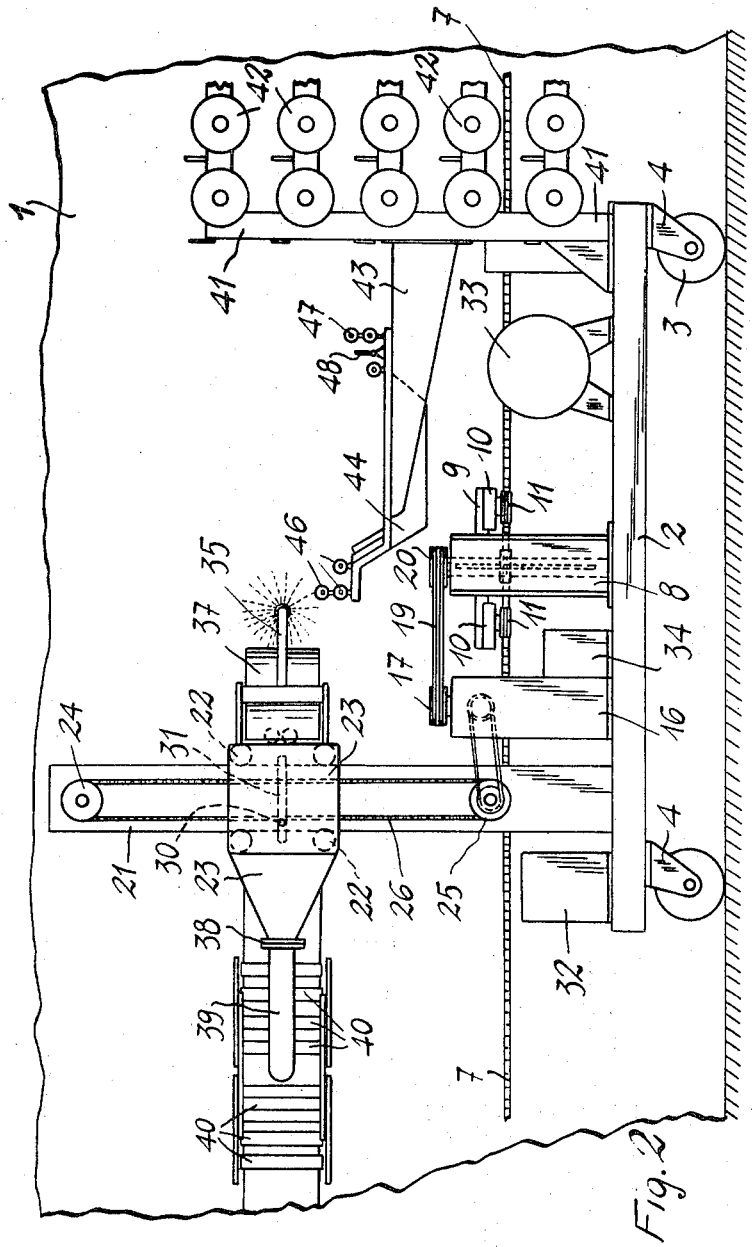

Still referring to FIGS. 1 and 2, it will be seen that slide 23 carries a reel 37 which is freely rotatable about its vertical axis and formed of a continuous glass fiber web commonly referred to as "Mat": of course, rather than being formed of glass fibers, said web of resistant material forming the reel 37 could be also made of different materials, such as rock wool, asbestos, rayon, nylon and the like.

As shown in the embodiment of FIGS. 1 and 2, slide 23 has a flange 38, to which an elongated shaped arm 39 is secured and at its free end carries a series of pressure rollers 40 which are urged to the surface of the rigid mold 1 by a spring accommodated within a cylindrical cavity in arm 39 comprising at said cavity two arm portions axially slidable to each other, one, arm portion being accommodated and movable telescopically within said cylindrical cavity of the other arm portion.

Trolley 2 carries a vertical upright 41 having a plurality of stationary supports, on which reels 42 are mounted for continuous threads of glass fibers or in the case rock wool, asbestos, rayon, nylon or the like.

By means of a bracket 43 said upright 41 also carries a basin 44 which is partially filled with a resin containing a catalyst, such as an epoxy resin, polyester, isophthalic or bisphenol resin, small rollers 45 being mounted adjacent the basin bottom, while further rollers 46 and 47 are mounted at the end of said basin. It will be also seen that a full series of combs 48 are provided for guiding the threads being unwound from said reels 42

In the above described apparatus, the holders for reel 37 and sprayer guns 35 and 36, as well as arm 39, can be separated by acting on said flange 38.

Figure 4:
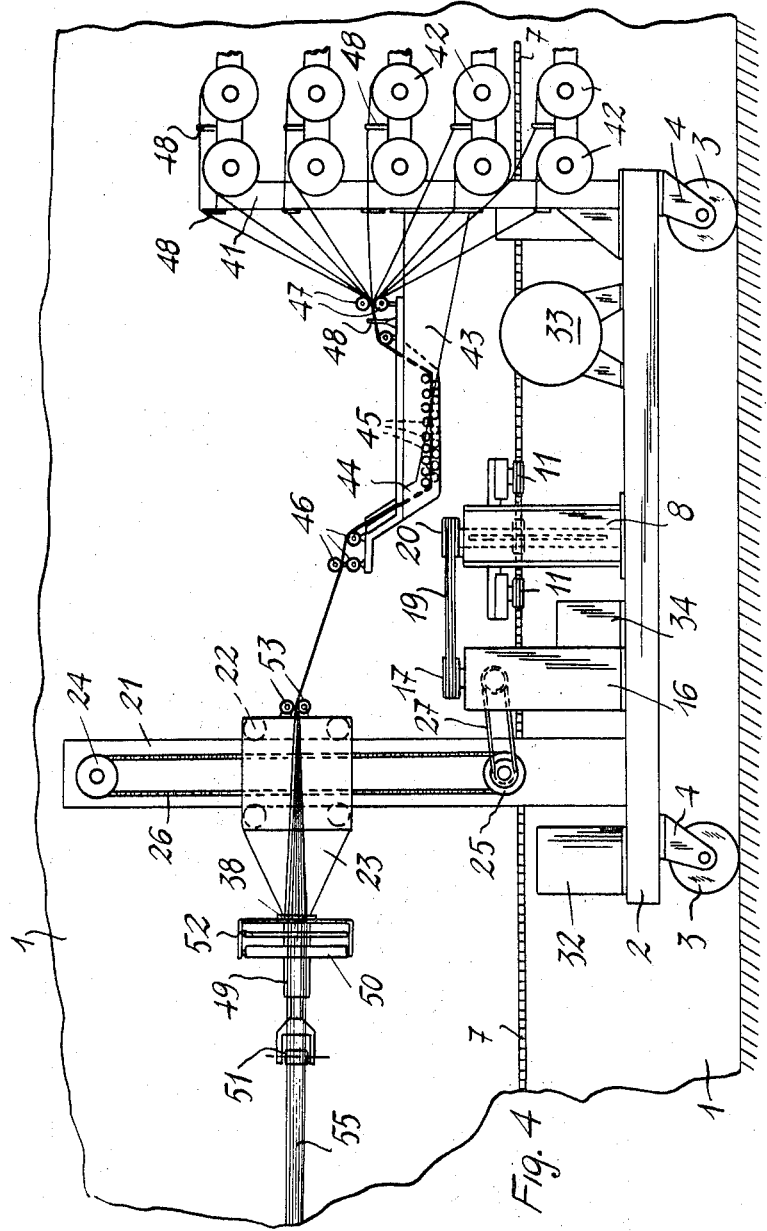

Instead of arm 39, an elongated arm 49 can be attached to flange 38, this arm 49 carrying a series of rollers 50 and 51 and a comb 52, a pair of rollers 53 (FIGS. 3 and 4), the function of which will be described in the following, are also fast with said slide 23.

Assume now that on the site where it is desired to build a large-sized hollow cylindrical body member, the rigid mold 1 has already been installed, trolley 2 has been positioned at the side of said rigid mold with rollers 5 abutting thereon and chain 7 engaging gear wheel 14 and stretched by tension rollers 11, and said arm 39, sprayer guns 35 and 36, and a reel 37 comprising a glass fiber web are connected to slide 23.

When geared motor unit 16 rotatably drives said gear wheel 14, the latter will act on chain 7 and cause trolley 2 to advance by a continuous rotary motion about mold 1. At the same time, slide 23 will be upwards and respectively downwards reciprocated. Since at the beginning of the described movements the free end of web 54 unwinding from reel 37 was attached to mold 1, it will result that during forward movement of the trolley and displacement of slide 23 said web 54 is distributed onto the outer surface of mold 1 according to a continuous spiral, establishing a superimposition of web layers, in which the coils of one layer are crosswise arranged relative to those of the underlying layer, the coil crossing being due just to the fact that said slide 23 along with reel 37 is upwards and respectively downwards reciprocated.

As web 54 is distributed, polymerizing catalyst containing resin is sprayed directly on the surface of mold 1 by sprayer gun 35 and respectively on the outer surface of web 54 by sprayer gun 36. The web being distributed all about the rigid mold 1 is without any discontinuity, highly impregnated with resin and hence highly resistant to chemical attack.

Prior to distributing the web from reel 37 onto the rigid mold 1, it would be preferable to spray the outer surface of mold 1 with an antiadhesive material, such as silicone, wax and the like, or said mold could be covered with layer of an antiadhesive material, such as siliconized paper or the like, which is wrapped on the mold similarly as above mentioned in connection with the glass fiber web 54.

It should be noted that pressure rollers 40, as carried by arm 39, would ensure an even adhesion for web 54 on the surface of mold 1 and the removal of any air bubbles.

When wrapping has been completed for the web of glass fiber or the like, impregnated with resin as above described, arm 39 is separated from flange 38 and sprayer guns 35 and 36 and reel 37 are removed from slide 23.

Next, arm 49 is attached to flange 38 (FIGS. 3 and 4) and from reel 42 the threads are unwound, passed between rollers 45, 46, 47, 53, 50 and combs 48, 52, and then guided on roller 51 distributing the same as a bundle of threads 55 on the underlying layer 56 previously formed with the superimposed spirals of web 54; threads from reels 52 are guided at the bottom of basin 44, impregnating with the resin therein, thus assuring a sealing for the threads to build up a rigid resistant unit, when the resin has completed its polymerization.

Also the threads are distributed as a plurality of superimposed layers comprising continuous spirals of thread bundles, the spirals in one layer being crosswise arranged relative to those in the underlying layer for the same above mentioned reasons.

In order to provide for a maximum mechanical strength in the wall comprising the thread bundle, the coils of said thread bundles should form a sufficiently wide angle relative to a vertical plane. As a result, the thread bundles would form coils in each layer which are spaced apart from the adjacent coils in the same layer. In other terms, during each upward or downward travel of the slide, the thread bundle is distributed with highly extended spirals, that is spirals which are spaced apart from one another, by a predetermined angulation. As the slide successively repeatedly travels, the thread bundles form successive layers with such displaced coils as to finally build up a closed wall free of voids and as thick as desired.

It should be noted that both distribution of coils of web 54 from reel 37, and distribution of coils of threads from reels 42, as well as impregnation for the web and threads with the catalyst containing resin, are completely automatically effected and with substantially higher distributing speed or rate about mold 1 than it would occur with a manually effected distribution.

It is important to note that the feeding rate for trolley 2 is strictly bounded to the displacement rate for slide 23, so that at a possible slowing down or stop for the trolley movement, a corresponding slowing down or stop for slide 23 would immediately occur. Since geared motor unit 16 drives pulleys 17 and 18 through two separate gearboxes or transmissions, a different speed ratio between feeding of trolley 2 and displacement of slide 23 can be selected, resulting in that the inclination for the coils of web 54 or the bundle of threads 55 distributed on rigid mold 1 can be varied.

At the completion of the winding for the rigid material layers distributed on the rigid mold 1, and as soon as the resin impregnating said layers has completed its curing, the rigid mold 1 is removed, thus obtaining a hollow cylindrical body member having a substantial resistance to chemical attack and high mechanical strength. Preferably, the cylindrical body member is provided as described, that is with an internal cylindrical layer comprising said web 54 and an external cylindrical layer made of the bundles of threads 55: however, it is apparent that the cylindrical body member could be made only by using said web 54 or by using the bundles of threads 55.

Preferably a device is provided which causes a stop interval for the movement of slide 23 at each of its upward and downward travels, respectively.

When the above described hollow cylindrical body member has been completed, said hollow cylindrical body member can be lifted and held at an upward lifted position, and therebeneath a new cylindrical body member can be made and bounded and sealed to that previously obtained: thus, the hollow cylindrical body member can attain also a substantially high length.

Finally, it should be noted that chain 7, rather than by rollers 11 which could be omitted, can be stretched by wheels 5 which may be projected from the trolley and abut on the rigid mold.

Since the described apparatus enables to mechanically draw near one another the coils of web 54 and bundle of threads 55 to provide an even thickness without any gaps and completely free of air bubbles, the coils of web and thread bundle are crosswise arranged to one another, the inclination for the coils of web and thread bundle can be selected and kept constant according to a certain value depending on the diameter and height of the cylindrical body member to be made and the strength such a body member should have, said cylindrical body member can be made with a wall having a somewhat reduced thickness, with the above mentioned advantage of a rapid construction.

What I claim is:

1. An apparatus for providing a hollow cylindrical body member of a resistant material utilizing a cylindrical mold comprising:
   a trolley carried by bearing wheels;
   at least two roller wheels carried by said trolley and projecting laterally from said trolley for abutting on the surface of said cylindrical mold;
   a motor unit coupled to a vertical shaft carried by said trolley for rotating said vertical shaft;
   a driving wheel on said vertical shaft, said drive wheel being rotatable by said vertical shaft;
   at least one looped chain engaging said drive wheel and positionable around the outer surface of said cylindrical mold;
   a column on said trolley forming a guide;
   a slide mounted for vertical reciprocation on said column;
   two sprockets mounted on said column, one of said sprockets being driven by said motor unit;
   a chain wound about said two sprockets and coupled to said slide for reciprocating said slide;
   a plurality of reel holders carried by said trolley for holding a plurality of reels of thread at said resistant material;
   a basin carried by said trolley for containing liquid resin;
   thread guide rollers coupled to said basin for guiding said thread in said basin to impregnate said thread with said liquid resin;
   an elongated arm fixed on said slide; and
   distributing rollers on said elongated arm for holding and distributing said threads impregnated with said liquid resin on said outer surface of said cylindrical mold.

2. The apparatus as claimed in Claim 1, wherein said motor unit includes means for varying the speed of rotation of said one driven sprocket relative to the speed of rotation of said driving wheel.

3. The apparatus as claimed in Claim 1 including:
   a bearing support carried by said trolley, said vertical shaft being rotatably carried by said bearing support;
   a rigid element vertically movable on said bearing support; and
   two tension rollers coupled to said looped chain, said driving wheel and said two tension wheels being restrained by said rigid element, said tension wheels being movable towards and away from each other to stretch said looped chain.

4. An apparatus for providing hollow cylindrical body members of resistant material utilizing a cylindrical mold comprising:
   a trolley carried by bearing wheels;
   at least two roller wheels projecting laterally from said trolley for abutting on the surface of said cylindrical mold;
   a motor unit coupled to a vertical shaft carried by said trolley for rotating said vertical shaft;

a driving wheel on said vertical shaft, said drive wheel being rotatable by said vertical shaft;

at least one looped chain engaging said drive wheel and positionable around the outer surface of said cylindrical mold;

a column on said trolley forming a guide;

a slide mounted for vertical reciprocation on said column;

two sprockets mounted on said column, one of said sprockets being driven by said motor unit;

a chain wound about said two sprockets and coupled to said slide for reciprocating said slide;

a reel holder carried by said slide for rotatably holding a web of said resistant material;

a spray gun fixed to said slide;

a reservoir of liquid resin carried by said trolley and coupled to said spray gun;

a source of compressed air carried by said trolley and connected to said spray gun for spraying said liquid resin on the surface of said web as said web is unwound from said reel;

an elongated arm fixed on said slide; and a plurality of pressure rollers on the free end of said elongated arm resiliently biased toward said mold for pressing said web as it is unwound onto said surface of said mold.

5. The apparatus as claimed in Claim 4, wherein said motor unit includes means for varying the speed of rotation of said one driven sprocket relative to the speed of rotation of said driving wheel.

6. The apparatus as claimed in Claim 4 including:

a bearing support carried by said trolley, said vertical shaft being rotatably carried by said bearing support;

a rigid element vertically movable on said bearing support; and two tension rollers coupled to said looped chain, said driving wheel and said two tension wheels being restrained by said rigid element, said tension wheels being movable towards and away from each other to stretch said looped chain.

References Cited
UNITED STATES PATENTS

| | | | |
|---|---|---|---|
| 3,616,070 | 10/1971 | Lemelson | 156—173 X |
| 3,452,940 | 7/1969 | Brandestini | 242—7.21 X |
| 3,553,045 | 1/1971 | Heh | 156—173 X |
| 3,577,294 | 5/1971 | David | 156—173 |
| 3,524,780 | 8/1970 | Clements | 156—175 X |
| 3,031,361 | 4/1962 | Strickland | 156—175 X |
| 2,808,097 | 10/1957 | Martin | 156—425 X |
| 3,174,388 | 3/1965 | Gaubatz | 242—7.21 |
| 3,380,675 | 4/1968 | Baxter et al. | 156—443 X |
| 3,299,588 | 1/1967 | Arnold | 264—32 X |
| 3,203,845 | 8/1965 | Short | 156—175 |

CHARLES E. VAN HORN, Primary Examiner

D. A. SIMMONS, Assistant Examiner

U.S. Cl. X.R.

156—173, 175; 242—7.21